United States Patent [19]

Wolker et al.

[11] Patent Number: 5,258,977
[45] Date of Patent: Nov. 2, 1993

[54] SWITCHING NETWORK FOR AN ASYNCHRONOUS TIME-DIVISION MULTIPLEX TRANSMISSION SYSTEM

[75] Inventors: Roland Wolker; Christine Mertelmeier, both of Erlangen, Fed. Rep. of Germany

[73] Assignee: U.S. Philips Corp., New York, N.Y.

[21] Appl. No.: 751,283

[22] Filed: Aug. 29, 1991

[30] Foreign Application Priority Data

Aug. 31, 1990 [DE] Fed. Rep. of Germany ....... 4027611

[51] Int. Cl.⁵ ............................................. H04J 3/24
[52] U.S. Cl. ...................................... 370/54; 370/58.1; 370/65; 340/826; 340/825.8; 379/272
[58] Field of Search ................. 370/53, 54, 58.1, 58.2, 370/58.3, 60, 60.1, 65, 65.5, 94.1; 340/825.03, 826, 825.79, 825.8; 379/271, 272

[56] References Cited

U.S. PATENT DOCUMENTS

| | | | |
|---|---|---|---|
| 4,866,701 | 9/1989 | Giacopelli et al. | 370/60 |
| 4,879,712 | 11/1989 | Littlewood | 370/60 |
| 5,091,903 | 2/1992 | Schrodi | 370/58.1 |
| 5,109,378 | 4/1992 | Proctor et al. | 370/58.1 |
| 5,119,369 | 6/1992 | Tanabe et al. | 370/60 |
| 5,123,011 | 6/1992 | Hein et al. | 370/60 |
| 5,138,612 | 8/1992 | Keller et al. | 370/60 |

*Primary Examiner*—Douglas W. Olms
*Assistant Examiner*—Alpus H. Hsu
*Attorney, Agent, or Firm*—Jack D. Slobod

[57] ABSTRACT

A switching network for an asynchronous time-division multiplex transmission system includes a first stage having a plurality of switching blocks (4 to 7), to which are applied over auxiliary lines cells and routing information intended for various trunk lines and which are coupled to at least one switching block (8, 9) of a second stage. Inputs of switching blocks (4 to 7) of the first stage are coupled to auxiliary lines and at least one output of a switching block (8, 9) of the second stage. Outputs of switching blocks of the first stage are coupled to trunk lines and to at least one input of a switching block of the second stage. A cell extraction circuit (56 to 61) which is always coupled to a control circuit (10 to 15) of the associated switching block is coupled either to at least one input or to at least one output of each switching block.

15 Claims, 2 Drawing Sheets

SWITCHING NETWORK FOR AN ASYNCHRONOUS TIME-DIVISION MULTIPLEX TRANSMISSION SYSTEM

BACKGROUND OF THE INVENTION

1. Field of the Invention

The invention relates to a switching network for an asynchronous time-division multiplex transmission system including a first stage which has a plurality of switching blocks which, over auxiliary lines, are supplied with cells or packets of digital data and routing information intended for various trunk lines and are coupled to at least one switching block of a second stage.

2. Description of the Related Art

In an asynchronous time-division multiplex transmission system, useful information, for example, television, video or audio signals, is transmitted in blocks of fixed lengths through systems for digital signal transmission. A block of a fixed length is understood to be a cell that comprises a predetermined number of bytes (for example, 53 bytes). Such a cell may be transmitted serially, i.e. bit by bit, or in parallel, i.e. byte by byte through the digital systems. Each cell comprises a header field, for example, 5 bytes in length and an information field, for example, 48 bytes in length which contains the useful information. Such a header field contains a routing identification code, error detection data (header field error block) and further control information signals. A routing identification code is understood to be routing information and channel identification codes. The routing information also termed tag is added in specific transmission arrangements in the time-division multiplex transmission system and contains an identification of the sub-target of the cell in the transmission arrangement. It may be added to the header field of the cell or added to the sub-target over a further channel. The channel identification code, also termed VCI (virtual channel identifier), comprises the information about the target or sub-target of the cell in the asynchronous time-division multiplex transmission system. On the basis of the virtual channel identifier a virtual channel is made available for the transmission of a cell. Habitually, a VCI is changed each time after an exchange has been reached.

Cells are consecutively allocated to specific time slots. The duration of such a time slot depends on the transmission component clock frequency used as a basis. If no useful information is available, dummy cells are transmitted in such a time slot, i.e. cells without useful information. Cells containing useful information are referenced useful cells.

When cells are transmitted among subscribers, the cells pass through switching networks in which paths are realised on the basis of the tag. Such a switching network which is connected to a plurality of auxiliary lines and trunk lines, consists of a plurality of switching blocks. Such a switching block which has a plurality of input and output lines consists of various switching elements. A switching element is connected to a number of input lines and one output line. In a switching element the cells from an input line are transferred to one output line. When cells to be transmitted over one output line and coming from various auxiliary lines arrive during a time slot, they are further processed in a specific order.

In the journal of "Telcom Report", the article entitled "Mit ATM zur bitvariablen Kommunikation", No. 3, 1990, Vol. 1, pp. 4 to 7, describes an asynchronous time-division communication system which comprises a switching network for switching cells. Various subscriber units, for example, a videotape recorder, a personal computer and a switch controller are connected to the switching network by means of trunk line groups.

SUMMARY OF THE INVENTION

It is an object of the invention to provide a switching network in which any auxiliary line can be coupled to any trunk line over a minimum number of switching blocks.

With a switching network of the type to which this invention pertains this object is achieved in that inputs of switching blocks of the first stage are coupled to auxiliary lines and at least one output of a switching block of the second stage and in that outputs of switching blocks of the first stage are coupled to trunk lines and at least one input of a switching block of the second stage.

In this configuration any auxiliary line can be coupled to any trunk line over any switching block of the second stage, so that a minimum number of switching blocks is used. In a conventional switching network always a third stage is used.

It is a further object of the invention to provide a switching network which supplies in a simple manner control information to the control circuit of a switching block.

This object is achieved in that a cell extraction circuit is coupled to either at least one input or at least one output of each switching block, which circuit is always connected to a control circuit of the allocated switching block.

The switching block comprises a first stage with a plurality of switching blocks and a second stage with at least one switching block. The inputs of the switching blocks of the first stage are always coupled to auxiliary lines and at least one output of a switching block of the second stage. The outputs of the switching blocks of the first stage are always coupled to trunk lines and at least one input of a switching block of the second stage. Interface circuits with parallel-to-serial converters or serial-to-parallel converters may be inserted between the various switching blocks of the two stages so as to reduce the circuitry and cost of trunks between the switching blocks especially with large switching networks. With this kind of interconnection between the switching blocks of the first and second stages, a control cell containing control and/or setting information which is applied to an input of a switching block of the first stage, can reach any switching block when specific paths in this switching block are released for transmitting the control cells. Such a control cell is recognized by the cell extraction circuit, extracted and applied to the control circuit allocated to a switching block. On the basis of the information in the control cell the control circuit can perform appropriate control and setting operations.

There is optimal use of the switching blocks when half the inputs of each switching block of the first stage are coupled to the auxiliary lines and half the outputs of each switching block of the first stage are coupled to trunk lines and when the remaining outputs of each switching block of the first stage are uniformly coupled to the inputs of the switching blocks of the second stage and the outputs of each switching block of the second stage are uniformly coupled to the remaining inputs of the switching blocks of the first stage.

Control cells containing control and setting information are generated by a system control circuit which is coupled to an input of a switching block of the first stage over a trunk line group.

For reporting the status information of a control circuit of the allocated switching block to the system control circuit there is provided that a cell insertion circuit is coupled to at least one input or at least one output of each switching block, which insertion circuit is connected to a control circuit of the allocated switching block. During this operation, control cells containing status information are produced by the cell insertion circuits. The control cells are then received from the system control circuit connected to an output of a switching block of the first stage through the trunk line group.

Before a cell is fed to a switching network, a group of trunk lines connected, for example, to a subscriber unit, generate a tag. The tag contains the indication about the target in the switching network. For example, the tag may be added to the header field of a cell. However, it is simpler to have the tags for each cell transmitted over channels towards the switching blocks and within the switching blocks.

In an embodiment of the invention there is provided for the cell extraction circuit that this circuit comprises a first change-over switch which directs cells to the allocated control circuit when the switch has adopted a first state and, when the switch has adopted a second state, to the allocated switching block, and comprises an analysis circuit which analyses the fed tag and supplies the first change-over switch with a setting signal for setting this switch to the first state when there is a control cell.

In an embodiment of the invention there is provided for the cell insertion circuit that this circuit comprises a second change-over switch which supplies cells from an output of the allocated switching block when the switch has adopted a first state and, when the switch has adopted a second state, relays control cells from the allocated control circuit and in that this switch is controlled by the allocated control circuit.

In a further embodiment of the invention there is provided that all the switching blocks have an equal number of inputs and outputs and in that the number of inputs is equal to the number of outputs. The switching blocks may then have each sixteen inputs and sixteen outputs and the number of switching blocks in the second stage may be equal to half the number of switching blocks in the first stage. Such a switching block may comprise 64 switching elements having four input lines and one output line. Such a switching element is known from German Patent Application P 40 12 768, to which U.S. Pat. No. 5,138,612 corresponds. The cells there leave a switching element in the order in which they have arrived. When cells have arrived simultaneously, they are conveyed to the output line of the switching element in a predetermined order. For example, the first stage may comprise four switching blocks and the second stage two switching blocks.

BRIEF DESCRIPTION OF THE DRAWING

Exemplary embodiments of the invention will be further explained with reference to the drawing Figures, in which.

DETAILED DESCRIPTION OF THE PREFERRED EMBODIMENTS

Figure 1:
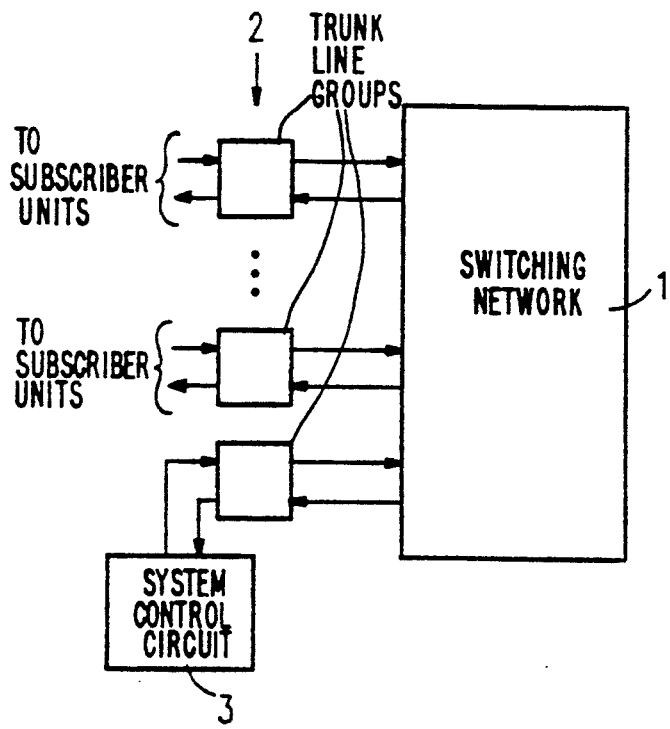
FIG. 1 gives a schematic representation of an exchange in an asynchronous time-division multiplex transmission system.

The exchange represented in FIG. 1 forms part of an asynchronous time-division multiplex transmission system and comprises a switching network 1, a plurality of trunk line groups 2 and a system control circuit 3. Subscriber units are connected to the trunk line group 2. Subscriber units are understood to be terminal units (for example, a video signal means, a telephone set etc.), a trunk termination or the system control circuit 3. Further switching arrangements, for example, an exchange, are connected to the trunk termination. The system control circuit 3 which is coupled to the switching network 1 by means of a trunk line group 2 controls the trunk line groups and the switching network 1. This control is performed by means of specific control cells, transmitted by the system control circuit 3, which cells are applied through a trunk line group 2 to the switching network 1 and through the switching network 1 to further trunk line groups 2. The arrows between the switching network 1 and the trunk line groups 2 and between the system control circuit 3 and a trunk line group 2 are to denote that, on the one hand, control cells travel from the switching network 1 over a trunk line group 2 to the system control circuit 3 and from the switching network 1 to other trunk line groups 2 and, on the other hand, from the system control circuit 3 over a trunk line group 2 to the switching network 1 or from a trunk line group 2 to the switching network 1. Thus, control cells are also transmitted from the system control circuit 3 over the switching network 1 to further trunk line groups 2.

In each trunk line group 2 tags relating to a path through the switching network 1 are generated for each cell on the basis of the information signals contained in the header field of a cell. The tag is directed over channels of a trunk line group 2 to the switching network 1 and over further channels within the switching network 1 to individual circuit components in the switching network 1. In addition to the tags being generated, for example, predetermined cells are extracted from the data stream in the trunk line groups, which cells are used, for example, for presignalling and monitoring and an established connection is monitored for overload.

Figure 2:
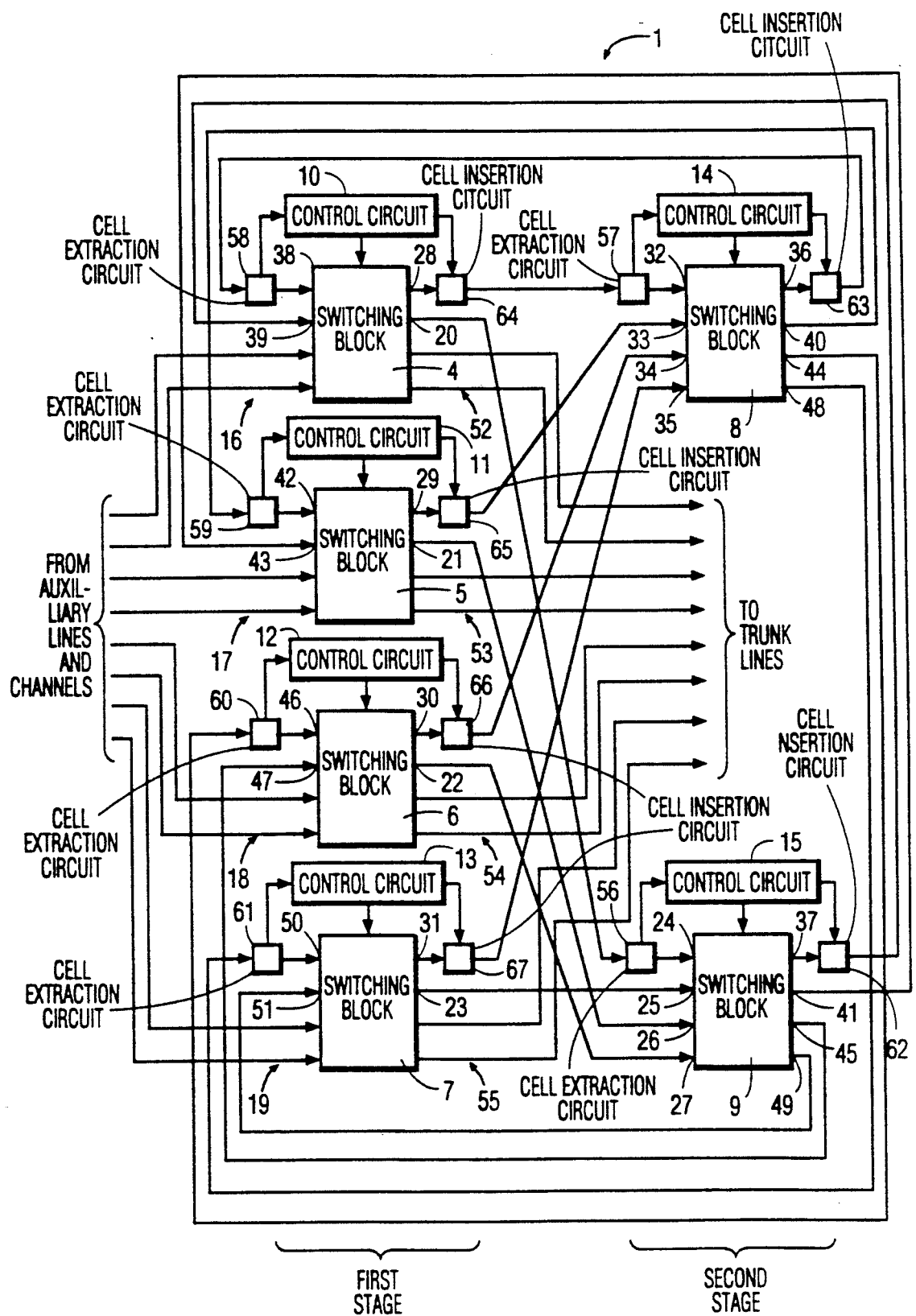
FIG. 2 shows a switching network used in the exchange and shown in detail.

FIG. 2 shows a diagram of an exemplary embodiment for a switching network 1. The switching network 1 comprises a first stage having four switching blocks 4 to 7 and a second stage having two switching blocks 8 and 9. Each switching block, which has sixteen inputs and outputs, is constituted by sixty-four switching elements having four inputs and one output each. Such a switching element which is disclosed, for example, in German Patent Application P 40 12 768, directs the cells arriving at the inputs to its output. During this operation the cells leave the switching element in the order in which they have arrived at the inputs. When cells simultaneously arrive at different inputs, they are transported to the output trunk of the switching element in a predetermined order. Each switching block 4 to 9 has its own assigned control circuit 10 to 15.

Each switching block 4 to 9 receives on an input a parallel data word and produces a parallel data word on an output. A parallel data word then has the length of one byte. With a cell length of, for example, 53 bytes, a cell is completely written into one switching block 4 to 9 after 53 bytes have been received. Each input additionally has a terminal for a channel over which a tag reaches the switching blocks 4 to 9.

In the drawing shown in FIG. 2 an arrow leading away from or leading towards a switching block is to denote a total of four outputs or inputs respectively, from which or to which parallel data words and tags are supplied.

Eight inputs 16 to 19 of each switching block 4 to 7 of the first stage are connected to auxiliary lines and channels over which a data stream of cells and tags are supplied. Four outputs 20 to 23 of the switching blocks 4 to 7 of the first stage are coupled to four inputs 24 to 27 of the switching block 9 of the second stage. Furthermore, four outputs 28 to 31 of the switching blocks 4 to 7 of the first stage are coupled to four inputs 32 to 35 of the switching block 8 of the second stage. Four outputs 36 of the switching block 8 and four outputs 37 of the switching block 9 are coupled to four inputs 38 and 39 of the switching block 4 of the first stage, four outputs 40 of the switching block 8 and four outputs 41 of the switching block 9 are coupled to four inputs 42 and 43 of the switching block 5, four outputs 44 of the switching block 8 and four outputs 45 of the switching block 9 are coupled to four inputs 46 and 47 of the switching block 6 and four outputs 48 of the switching block 8 and four outputs 49 of the switching block 9 are coupled to four inputs 50 and 51 of the switching block 7. The switching blocks 4 to 7 further have each eight outputs 52 to 55 which are connected to trunk lines. In the switching network 1 connections are realised in the individual switching blocks so that, in response to tags a cell reaches a predetermined trunk line.

A cell extraction circuit 56 to 61 is arranged before one of the four inputs 24, 32, 38, 42, 46 and 50 of the switching blocks 4 to 9. A cell extraction circuit 56 to 61 extracts control cells from the cell stream supplied to one of the inputs which are to be supplied to the allocated control circuits 10 to 15. A control circuit 10 to 15 takes control and setting information from the information field of a control cell, in response to which information this circuit sets the allocated switching block 4 to 9, for example, when the system is initialized.

A control circuit 10 to 15 further supplies control cells containing status information to an allocated cell insertion circuit 62 to 67, which status information is injected into the cell stream which originates from one of the inputs 28 to 31, 36 and 37.

According to the arrangement of the switching blocks 4 to 9 in the switching network 1 in accordance with the invention, the supply of control cells through an arbitrary input 16 to 19 of the switching blocks 4 to 7 of the first stage achieves that each switching block 4 to 9 can be supplied with control cells. Similarly, an output 52 to 55 of a switching block 4 to 7 of the first stage receives a control cell containing status information from each control circuit 10 to 15. The control cells are then applied to the input of a switching block 4 to 7 of the first stage by means of the system control circuit 3 over a trunk line group 2 and in like manner the system control circuit 3 receives control cells with status information over a trunk line group 2 from one of the four outputs 52 to 55 of a switching block 4 to 7.

Especially with rather long trunk lines between the individual switching blocks of the two stages, interfaces may be necessary, which provide a parallel-to-serial conversion or a serial-to-parallel conversion and a scrambling or a descrambling of cells.

Figure 3:
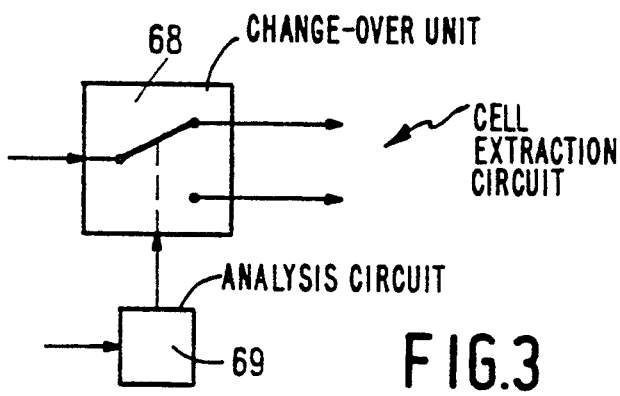
FIG. 3 shows a cell extraction circuit used in the switching network and shown in detail.

An exemplary embodiment for a cell extraction circuit 56 to 61 is represented in FIG. 3. This drawing Figure shows a first change-over switch 68 which, when adopting a first state, supplies a cell produced by a switching block 4 to 9 to the allocated control circuit 10 to 15 and, when adopting a second state, supplies a cell to the allocated switching block 4 to 9. An analysis circuit 69 controls the first change-over switch 68 by means of a setting signal over a control line. The analysis circuit 69 receives the tag over a channel and sets the first change-over switch 68 in response to this tag.

Figure 4:
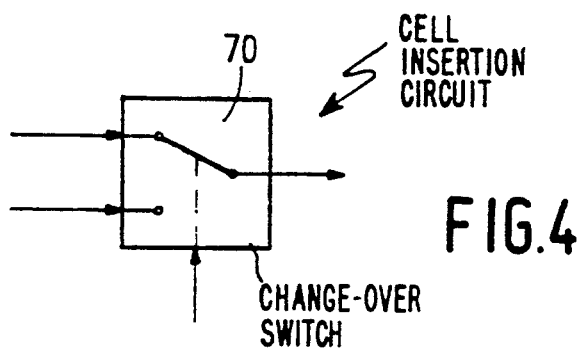
FIG. 4 shows a cell insertion circuit used in the switching network and shown in detail.

An exemplary embodiment for a cell insertion circuit 62 to 67 is shown in drawing FIG. 4. The cell insertion circuit 62 to 67 comprises a second change-over switch 70 which, when adopting a first state, supplies the cell produced by the allocated switching block 4 to 9 and, when adopting a second state, supplies the control cell containing status information and produced by the control circuit 10 to 15 at the output of the second change-over switch 70. The cell insertion circuit 62 to 67 is controlled by the allocated control circuit 10 to 15.

It should further be observed that clock lines have not been represented in the drawing FIGS. 1 to 4 for clarity.

What is claimed is:

1. Switching network for an asynchronous time-division multiplex transmission system for conveying cells of digital information including routing information between auxiliary lines and trunk lines, said network comprising a first stage and a second stage;

said first stage comprising a plurality of switching blocks collectively having a plurality of inputs coupled to the auxiliary lines, one or more further inputs, a plurality of outputs coupled to the trunk lines, and one or more further outputs;

said second stage comprising one or more switching blocks, collectively having one or more inputs coupled to said one or more further outputs of said first stage, respectively, and one or more outputs coupled to said one or more further inputs of said first stage, respectively.

2. Switching network as claimed in claim 1, wherein cells arriving at said first stage via said auxiliary lines include control cells containing control information and further comprising associated with each switching block of the first and second stages, a respective cell extraction circuit in series with an input or output of the associated switching block for extracting said control cells containing control information from a cell stream flowing in said input or output, and a respective control circuit connected for receiving control information from the respective cell extraction circuit.

3. Switching network as claimed in claim 2, wherein each switching block of the first stage has an even number of inputs and an even number of outputs, half of the inputs of each switching block of the first stage being coupled to the auxiliary lines and half the outputs of each switching block of the first stage being coupled to the trunk lines and the other half of the outputs of each switching block of the first stage being uniformly coupled to the inputs of the switching blocks of the second stage, and the outputs of each switching block of the second stage being uniformly coupled to the other half of the inputs of the switching blocks of the first stage.

4. Switching network as claimed in claim 2, wherein the respective cell extraction circuit is in series with an input of the associated switching block and comprises a first change-over switch which directs extracted control cells to the respective control circuit when the switch has adopted a first state and, when the switch has adopted a second state, directs the cell stream flowing in said input to the associated switching block, and comprises an analysis circuit which analyses the routing information contained in the control cell and supplies the first change-over switch with a setting signal for setting this switch to the first state in response to the routing information indicating that a cell is a control cell routed to the respective control circuit.

5. Switching network as claimed in claim 1, further comprising associated with each switching block of the first and second stages, a respective cell insertion circuit in series with an input or output of the associated switching block and coupled to said respective control circuit for inserting control cells comprising information received from a respective control circuit into a cell stream flowing in said input or output.

6. Switching network as claimed in claim 5, wherein each switching block of the first stage has an even number of inputs and an even number of outputs, half of the inputs of each switching block of the first stage being coupled to the auxiliary lines and half the outputs of each switching block of the first stage being coupled to the trunk lines and the other half of the outputs of each switching block of the first stage being uniformly coupled to the inputs of the switching blocks of the second state, and the outputs of each switching block of the second stage being uniformly coupled to the other half of the inputs of the switching blocks of the first stage.

7. Switching network as claimed in claim 5, wherein the respective cell insertion circuit inserts control cells containing information as to status of the respective control circuits, and an output of a switching block of the first stage is coupled to a system control circuit for receiving the control cells containing status information.

8. Switching network as claimed in claim 5, wherein the respective cell insertion circuit is in series with an output of the associated switching block and comprises a change-over switch controlled by the respective control circuit which directs the cell stream flowing in said output to the associated switching block when the switch has adopted a first state and, when the switch has adopted a second state, relays control information from the respective control circuit.

9. Switching network as claimed in claim 1, wherein cells arriving at said first stage via said auxiliary lines include control cells containing control information, and further comprising associated with each switching block of the first and second stages, a respective cell extraction circuit in series with an input or output of the associated switching block for extracting said control cells containing control information from a cell stream flowing in said input or output, a respective control circuit connected for receiving control information contained in extracted control cells from said respective cell extraction circuit and for controlling the associated switching block, and a respective cell insertion circuit in series with another input or output of the associated switching block for inserting control cells comprising information received from the respective control circuit into a cell stream flowing in said another input or output.

10. Switching network as claimed in claim 9, wherein the respective cell extraction circuit is in series with an input of the associated switching block and comprises a first change-over switch which directs extracted control cells to the respective control circuit when the switch has adopted a first state and, when the switch has adopted a second state, directs the cell stream flowing in said input to the associated switching block, and comprises an analysis circuit which analyses the routing information contained in the control cell and supplies the first change-over switch with a setting signal for setting this switch to the first state in response to the routing information indicating a control cell routed to the respective control circuit.

11. Switching network as claimed in claim 1, wherein an input of a switching block of the first stage is coupled to a system control circuit which generates said control cells containing control information.

12. Switching network as claimed in claim 1, wherein the routing information contained in said cells of digital information is transmitted over channels toward the switching blocks and within the switching blocks.

13. Switching network as claimed in claim 1, wherein each of the switching blocks of the first and second stages has an equal number of inputs and outputs, and the number of inputs is equal to the number of outputs.

14. Switching network as claimed in claim 1, wherein each of the switching blocks has sixteen inputs and sixteen outputs, the first stage consists of a first number of switching blocks, and the second stage consists of a second number of switching blocks, which is half the first number.

15. Switching network for an asynchronous time-division multiplex transmission system for conveying cells of digital information including routing information between auxiliary lines and trunk lines, said network comprising a first stage and a second stage;

said first stage comprising a plurality of switching blocks collectively having a plurality of inputs coupled to the auxiliary lines, one or more further inputs, a plurality of outputs coupled to the trunk lines, and one or more further outputs;

said second stage comprising one or more switching blocks, collectively having one or more inputs coupled to said one or more further outputs of said first stage, respectively, and one or more outputs coupled to said one or more further inputs of said first stage, respectively;

wherein each switching block of the first stage has an even number of inputs and an even number of outputs, half of the inputs of each switching block of the first stage being coupled to the auxiliary lines and half the outputs of each switching block of the first stage being coupled to the trunk lines and the other half of the outputs of each switching block of the first stage being uniformly coupled to the inputs of the switching blocks of the second stage, and the outputs of each switching block of the second stage being uniformly coupled to the other half of the inputs of the switching blocks of the first stage.

* * * * *